US012002347B2

(12) United States Patent
Fazio

(10) Patent No.: US 12,002,347 B2
(45) Date of Patent: Jun. 4, 2024

(54) POP OUT EXIT INDICATOR

(71) Applicant: John Fazio, New Paltz, NY (US)

(72) Inventor: John Fazio, New Paltz, NY (US)

( * ) Notice: Subject to any disclaimer, the term of this patent is extended or adjusted under 35 U.S.C. 154(b) by 100 days.

(21) Appl. No.: 17/329,321

(22) Filed: May 25, 2021

(65) Prior Publication Data

US 2022/0383708 A1 Dec. 1, 2022

(51) Int. Cl.

| | |
|---|---|
| ***G08B 5/26*** | (2006.01) |
| ***G09F 7/18*** | (2006.01) |
| ***G09F 7/22*** | (2006.01) |
| ***G09F 13/22*** | (2006.01) |

(52) U.S. Cl.
CPC ................ *G08B 5/26* (2013.01); *G09F 7/22* (2013.01); *G09F 13/22* (2013.01); *G09F 2007/1873* (2013.01); *G09F 2013/222* (2013.01)

(58) Field of Classification Search
None
See application file for complete search history.

(56) References Cited

U.S. PATENT DOCUMENTS

| | | | | |
|---|---|---|---|---|
| 4,489,308 A * | 12/1984 | Logan, Jr. | G08B 7/062 | 242/390.8 |
| 5,950,340 A * | 9/1999 | Woo | G09F 13/04 | 362/249.05 |
| 6,050,013 A * | 4/2000 | Heaton | G09F 13/04 | 40/574 |
| 6,430,853 B1 * | 8/2002 | Choi | G09F 13/04 | 40/564 |
| 6,457,270 B1 * | 10/2002 | Stark, III | G09F 13/18 | 362/812 |
| 6,785,992 B2 * | 9/2004 | Chiarucci | G09F 19/22 | 40/616 |
| 7,423,548 B2 * | 9/2008 | Kontovich | G08B 7/066 | 40/430 |
| 7,771,085 B2 * | 8/2010 | Kim | H01R 33/9453 | 362/249.02 |
| 7,997,757 B2 * | 8/2011 | Patrick | G09F 19/22 | 362/217.02 |
| 8,468,726 B1 * | 6/2013 | Hetrick | F21V 21/03 | 362/365 |
| 8,998,440 B1 * | 4/2015 | Wu | G09F 13/04 | 362/217.1 |
| 10,360,824 B1 * | 7/2019 | Formel | G09F 7/02 | |
| 10,867,534 B2 * | 12/2020 | Bloomberg | G09F 13/18 | |
| 11,170,673 B2 * | 11/2021 | Gamble | G09F 13/18 | |
| 11,195,438 B2 * | 12/2021 | Gow | G09F 13/0422 | |
| 2002/0099900 A1 * | 7/2002 | Kawarai | H04L 49/201 | 710/317 |

(Continued)

OTHER PUBLICATIONS https://coloradosprings.gov/fire-department/page/exit-signs-and-emergency-lighting (See "Placement of Low Level Exit Signs").

*Primary Examiner* — Fekadeselassie Girma
(74) *Attorney, Agent, or Firm* — OMNIVAULT LLC; Robert Denis

(57) ABSTRACT

A flush wall mounted fire exit sign and an activation system to cause the exit sign to move outward from the wall when the exit sign is needed for viewing and providing direction to a building's exit. The exit sign may be mounted lower on the wall than traditional exit signage and rotate from the wall for people to view and may retract when a fire event is over.

20 Claims, 9 Drawing Sheets

(56) References Cited

U.S. PATENT DOCUMENTS

| | | | | |
|---|---|---|---|---|
| 2003/0217494 | A1* | 11/2003 | Chiarucci | G09F 19/22 40/584 |
| 2006/0077069 | A1* | 4/2006 | Kontovich | G08B 7/066 340/815.87 |
| 2010/0054796 | A1* | 3/2010 | Nakamura | G03G 15/0896 399/111 |
| 2014/0331533 | A1* | 11/2014 | Hasan | G09F 13/0445 40/570 |
| 2016/0003428 | A1* | 1/2016 | Anderson | F21S 4/26 362/147 |
| 2016/0027266 | A1* | 1/2016 | McDonagh | G08B 7/062 340/815.4 |
| 2017/0297714 | A1* | 10/2017 | Schneider | B64D 11/0015 |
| 2018/0144668 | A1* | 5/2018 | Gow | G09F 13/08 |
| 2019/0147777 | A1* | 5/2019 | Notarkesh | G09F 7/22 40/610 |
| 2019/0213926 | A1* | 7/2019 | Katz | G09F 13/0413 |
| 2019/0295386 | A1* | 9/2019 | Roberts | G08B 7/062 |
| 2020/0342792 | A1* | 10/2020 | Gow | G09F 13/22 |
| 2021/0301540 | A1* | 9/2021 | Kim | A62B 5/00 |
| 2022/0130293 | A1* | 4/2022 | Cline | G09F 27/004 |
| 2022/0383708 | A1* | 12/2022 | Fazio | G08B 5/26 |
| 2022/0404547 | A1* | 12/2022 | Bian | G02B 6/12004 |

* cited by examiner

POP OUT EXIT INDICATOR

CROSS-REFERENCES TO RELATED APPLICATIONS

This application claims the benefit of provisional application No. 63/030,355 entitled POP OUT EXIT INDICATOR, filed May 27, 2020. The provisional application is incorporated in its entirety by reference.

FIELD OF INVENTION

The present invention relates generally to an emergency signage device. More particularly, the present invention is related an emergency exit sign to be deployed in the event of a fire.

BACKGROUND OF THE INVENTION

Current fire exit signs are mounted high on the walls above doorways. During a fire event, the smoke accumulates upward towards the ceilings, which covers exit signs mounted above doorways. People are taught to stay low towards the floor when there is oxygen and less smoke. The coverage of exit signs removes the purpose of exit signs in providing a sense of direction for people crawling along the floor to be directed to the exit for escape.

SUMMARY OF THE INVENTION

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The present invention is defined by the claims.

Embodiments of the present invention may comprise a flush wall mounted fire exit sign mounted lower on the wall as compared to traditional exits signage. This placement may make the present invention more visible to people experiencing an emergency, for example, people crawling to safety through a smoke-filled corridor. Embodiments of the present invention may include an exit sign and an activation system. The exit sign may rotate from the wall for people to view. The activation system may cause the exit sign to move outward from the wall when the exit sign is needed for viewing and providing direction to a building's exit. In some embodiments, the exit sign may retract when a fire event is over. In some embodiments, the exit sign may be illuminated.

The activation system may require a triggering mode to trigger movement of the exit sign. In some embodiments, the triggering mode may be provided by a signal from the smoke and/or fire detection systems when smoke or fire is detected. In other embodiments, the triggering mode may use of a decibel meter as part of the activation system that triggers the triggering mode when the decibel meter detects an audible fire alarm. In some embodiments, the present invention may include a battery or other independent power source such that it can be retrofitted into existing structure or where rewiring is otherwise not possible.

In some embodiments, the present invention may include a bracket connected to the activation system as part of the exit sign, which may allow for existing exit signs to be mounted to the bracket.

BRIEF DESCRIPTION OF THE DRAWINGS

The present invention is described in detail below with reference to the attached drawing figures, wherein.

DETAILED DESCRIPTION OF THE INVENTION

Some embodiments of the present invention are described with specificity herein to meet statutory requirements. However, the scope of the invention is not intended to be defined by the description itself. The claimed subject matter may be embodied as to include different features, elements, components, steps, or combinations of steps, similar to those described herein, and in combination with other existing or future technologies. Moreover, although the term "step" might be used to connote different elements of the methods employed, this term should not be interpreted as implying any particular order among or between various steps herein disclosed unless and except the order of individual steps is explicitly described or required.

Embodiments of the present invention may comprise a flush wall mounted fire exit sign mounted lower on the wall as compared to traditional exits signage. This placement may make the present invention more visible to people experiencing an emergency, for example, people crawling to safety through a smoke-filled corridor.

Figure 1:
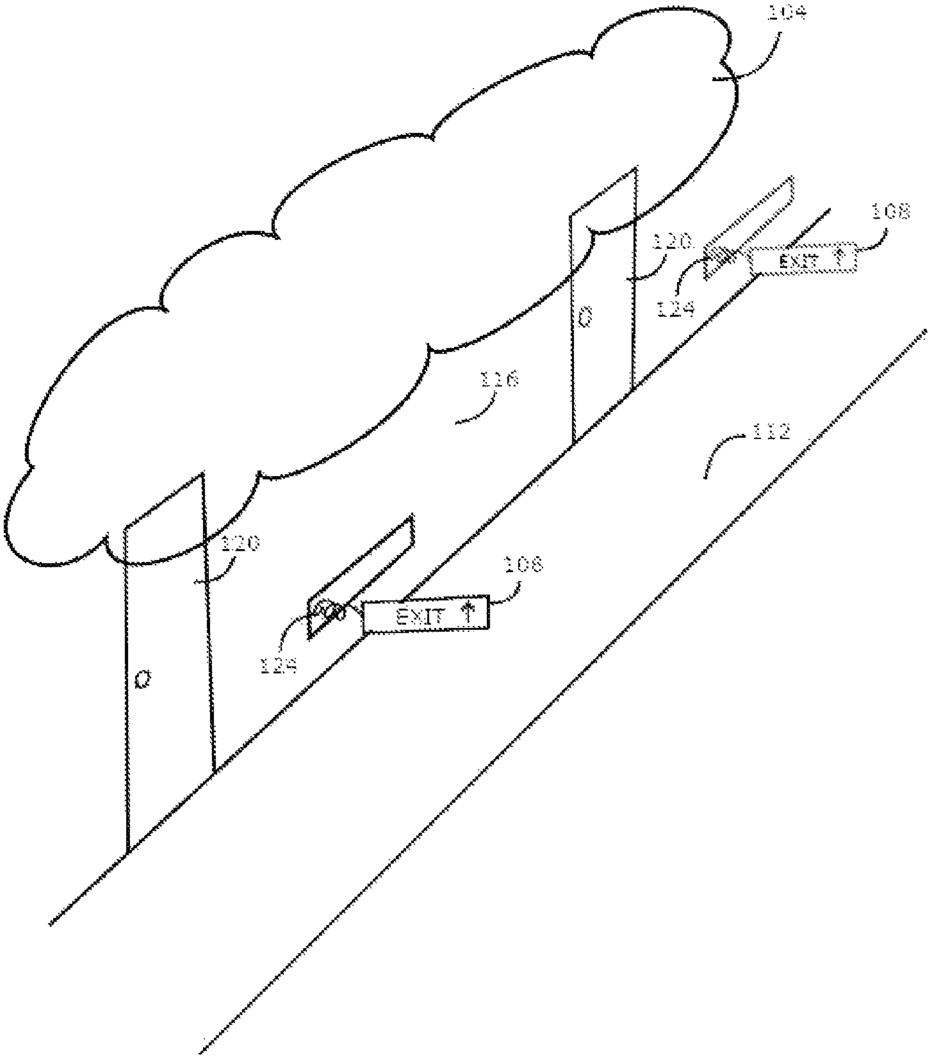
FIG. 1 illustrates an embodiment of the present invention as deployed during a fire event.

FIG. 1 shows an embodiment of the present invention as deployed during a fire event. The exit sign 108 may rotate from the wall 116 for people to view. In such an event, smoke 104 accumulates near the ceiling and the upper part of the wall of a building. The pop out exit signs 108 aid in evacuating people from a building during a fire. The exit signs 108 may be flexible so as not to block exit routes. In some embodiments, the exit signs 108 may not extend pass door moldings so exit signs 108 would not be a hazard when the exit signs 108 are not activated. In some embodiments, the exit sign may retract when a fire event or other emergency is over. As seen in FIG. 1, the exit signs 108 are shown near the floor 112 of the building. The wall 116 includes doors 120 that do not lead to an exit. FIG. 1 The exit signs 108 have popped out and are supported by springs 124. In some embodiments of the present invention, the springs 124 may be flexible such that exit signs 108 may easily move out of the way and not obstruct the path of evacuating people or first responders.

In some embodiments, retracting the sign may be accomplished manually, with a user resetting a release mechanism of the exit sign. In some other embodiments, the exit sign may further comprise a reset mechanism enabled to return the exit sign to its original, flush-mounted position.

In some embodiments, the exit sign may be illuminated. Illumination may be provided, for example, with an electric light or with the use of a luminescent tape or ink.

Figure 2:
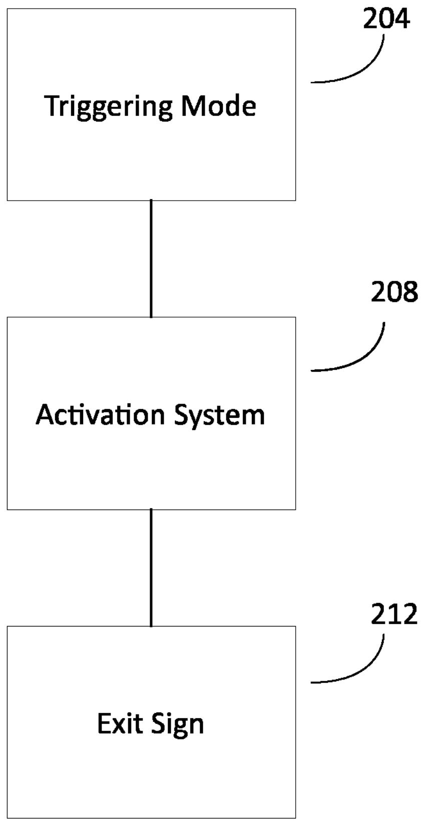
FIG. 2 provides a block diagram illustrating an embodiment of the present invention.

FIG. 2 provides a block diagram illustrating an embodiment of the present invention. Embodiments of the present invention may include an exit sign 212 and an activation system 208. The activation system 208 may cause the exit sign 212 to move outward from the wall when the exit sign is needed for viewing and providing direction to a building's exit. In some embodiments, the exit sign may be spring loaded so that the exit sign pops out from the wall when called for by the activation system 208.

The activation system 208 may require a triggering mode 204 to trigger movement of the exit sign. In some embodiments, the triggering mode 204 may be provided by through a signal from the smoke and/or fire detection systems when smoke or fire is detected. Such a signal may be provided via wiring of the activation system directly into smoke and/or fire detection system, or through wireless communication between the smoke and/or fire detection system and the activation system. On having skill in the art will recognize that wireless communication may be provided through various modes, including but not limited to, WIFI, Bluetooth, mesh network, infrared (IR) signal, radio signal, microwave signal or the like. In other embodiments, the triggering mode 204 may use of a decibel meter as part of the activation system that triggers the triggering mode 204 when the decibel meter detects an audible fire alarm.

Figure 3:
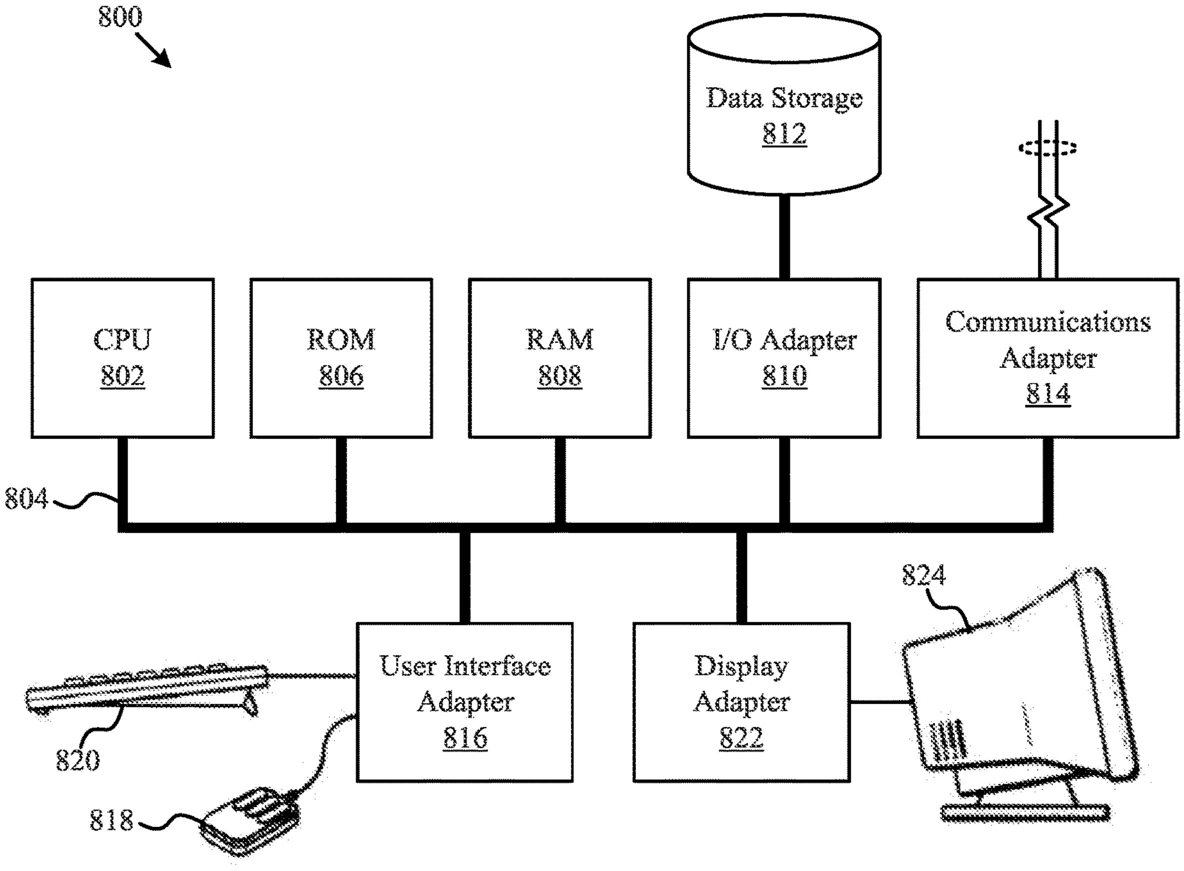
FIG. 3 illustrates a computer system adapted according to certain embodiments of the present invention.

In some embodiments of the present invention, components described herein FIG. 3 illustrates a computer system 800 adapted according to certain embodiments of the present invention. The central processing unit ("CPU") 802 is coupled to the system bus 804. The CPU 802 may be a general-purpose CPU or microprocessor, graphics processing unit ("GPU"), and/or microcontroller. The present embodiments are not restricted by the architecture of the CPU 802 so long as the CPU 802, whether directly or indirectly, supports the operations as described herein. The CPU 802 may execute the various logical instructions according to the present embodiments.

The computer system 800 also may include random access memory (RAM) 808, which may be synchronous RAM (SRAM), dynamic RAM (DRAM), synchronous dynamic RAM (SDRAM), or the like. The computer system 800 may utilize RAM 808 to store the various data structures used by a software application. The computer system 800 may also include read only memory (ROM) 806 which may be PROM, EPROM, EEPROM, optical storage, or the like. The ROM may store configuration information for booting the computer system 800. The RAM 808 and the ROM 806 hold user and system data, and both the RAM 808 and the ROM 806 may be randomly accessed.

The computer system 800 may also include an input/output (I/O) adapter 810, a communications adapter 814, a user interface adapter 816, and a display adapter 822. The I/O adapter 810 and/or the user interface adapter 816 may, in certain embodiments, enable a user to interact with the computer system 800. In a further embodiment, the display adapter 822 may display a graphical user interface (GUI) associated with a software or web-based application on a display device 824, such as a monitor or touch screen.

The I/O adapter 810 may couple one or more storage devices 812, such as one or more of a hard drive, a solid state storage device, a flash drive, a compact disc (CD) drive, a floppy disk drive, and a tape drive, to the computer system 800. According to one embodiment, the data storage 812 may be a separate server coupled to the computer system 800 through a network connection to the I/O adapter 810. The communications adapter 814 may be adapted to couple the computer system 800 to the network 708, which may be one or more of a LAN, WAN, and/or the Internet. The communications adapter 814 may also be adapted to couple the computer system 800 to other networks such as a global positioning system (GPS) or a Bluetooth network. The user interface adapter 816 couples user input devices, such as a keyboard 820, a pointing device 818, and/or a touch screen (not shown) to the computer system 800. The keyboard 820 may be an on-screen keyboard displayed on a touch panel. Additional devices (not shown) such as a camera, microphone, video camera, accelerometer, compass, and or gyroscope may be coupled to the user interface adapter 816. The display adapter 822 may be driven by the CPU 802 to control the display on the display device 824. Any of the devices 802-822 may be physical and/or logical.

The applications of the present disclosure are not limited to the architecture of computer system 800. Rather the computer system 800 is provided as an example of one type of computing device that may be adapted to perform the functions of a server 702 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, state machine digital logic-based circuitry, or other circuitry.

The embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules. As such, persons of ordinary skill in the art may utilize any number of suitable electronic devices and similar structures capable of executing a sequence of logical operations according to the described embodiments. For example, the computer system 800 may be virtualized for access by multiple users and/or applications.

Figure 4A:
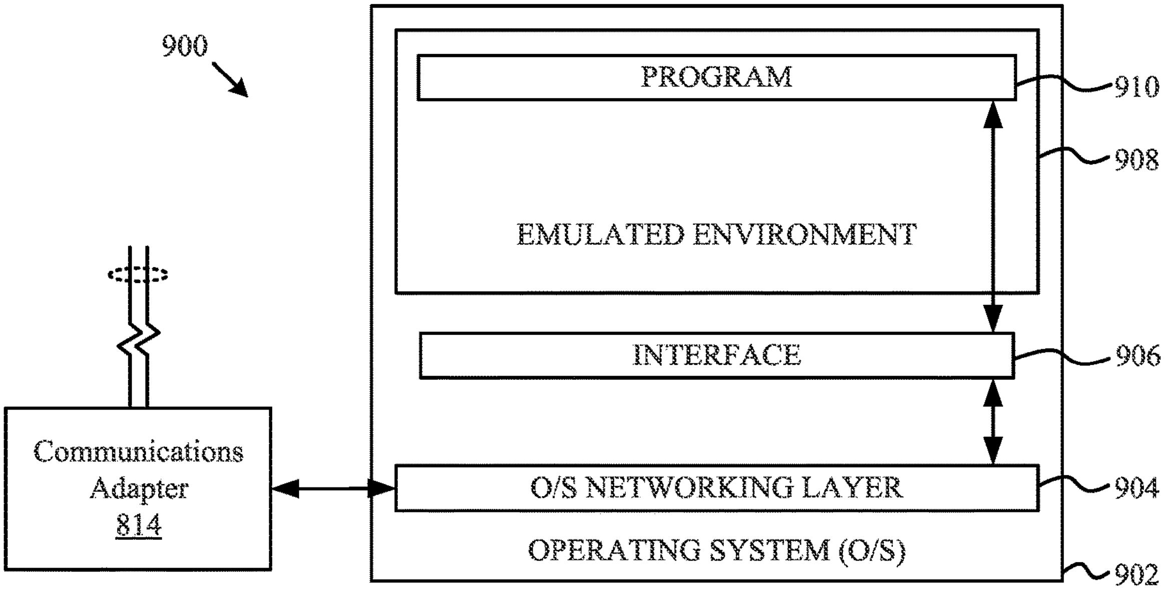
FIG. 4A provides a block diagram illustrating a server hosting an emulated software environment for virtualization according to one embodiment of the disclosure.

FIG. 4A is a block diagram illustrating a server hosting an emulated software environment for virtualization according to one embodiment of the disclosure. An operating system 902 executing on a server includes drivers for accessing hardware components, such as a networking layer 904 for accessing the communications adapter 814. The operating system 902 may be, for example, Linux. An emulated environment 908 in the operating system 902 executes a program 910, such as CPCommOS. The program 910 accesses the networking layer 904 of the operating system 902 through a non-emulated interface 906, such as XNIOP. The non-emulated interface 906 translates requests from the program 910 executing in the emulated environment 908 for the networking layer 904 of the operating system 902.

Figure 4B:
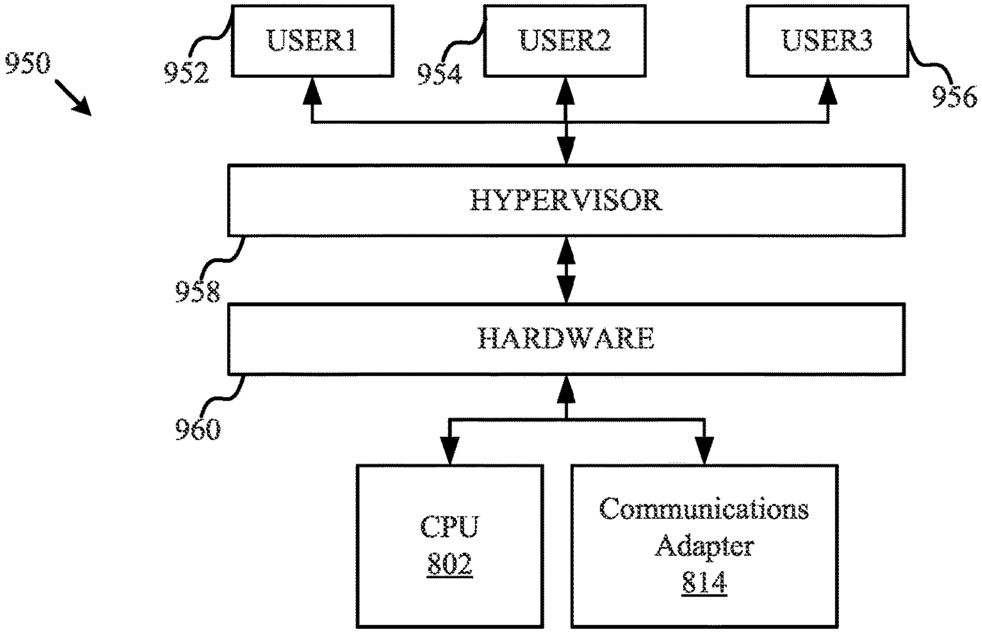
FIG. 4B provides a block diagram illustrating a server hosting an emulated hardware environment according to one embodiment of the disclosure.

In another example, hardware in a computer system may be virtualized through a hypervisor. FIG. 4B is a block diagram illustrating a server hosting an emulated hardware environment according to one embodiment of the disclosure. Users 952, 954, 956 may access the hardware 960 through a hypervisor 958. The hypervisor 958 may be integrated with the hardware 960 to provide virtualization of the hardware 960 without an operating system, such as in the configuration illustrated in FIG. 9A. The hypervisor 958 may provide access to the hardware 960, including the CPU 802 and the communications adaptor 814.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. The terms "disk" and "disc" include compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

In some embodiments, the present invention may include a bracket connected to the activation system as part of the exit sign, which may allow for existing exit signs to be mounted to the bracket.

Figure 5A:
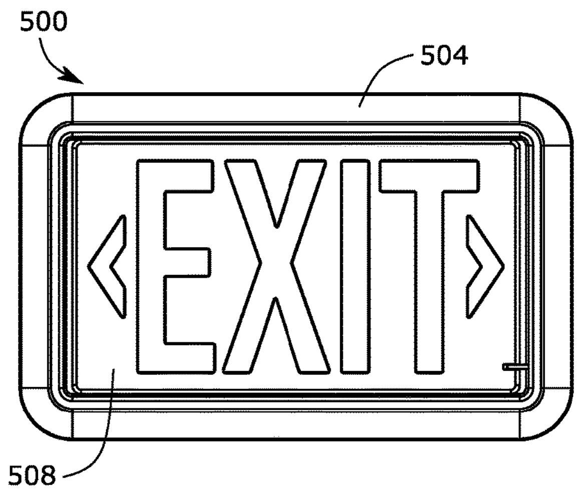
FIG. 5A provides a front view of an embodiment of the present invention in a closed configuration.
Figure 5B:
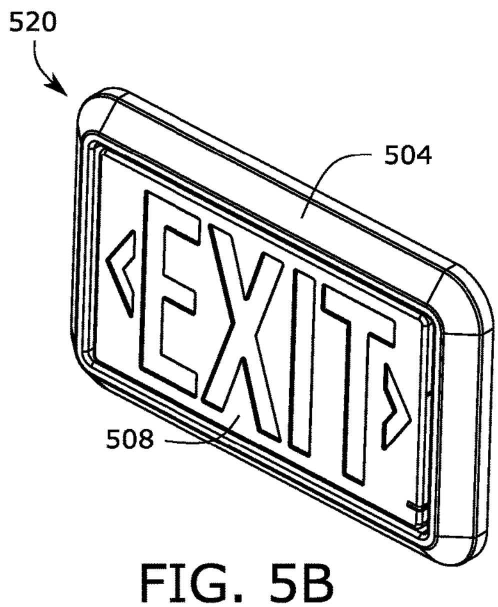
FIG. 5B provides a perspective view of an embodiment of the present invention in a closed configuration.
Figure 5C:
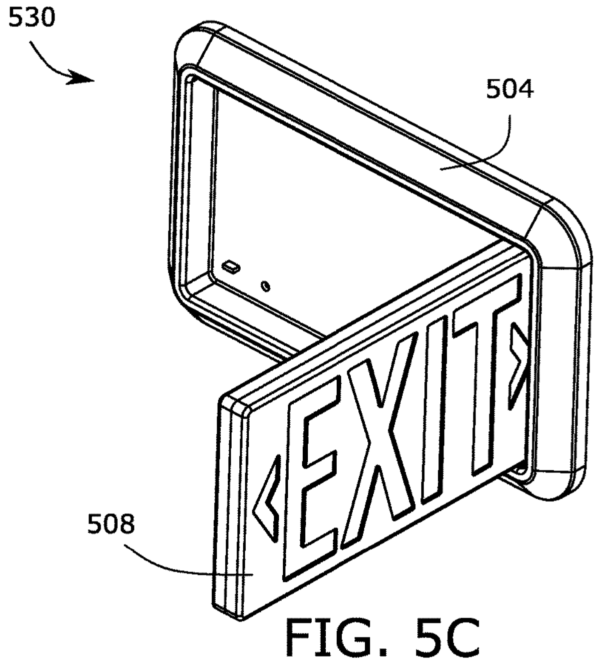
FIG. 5C provides a perspective view of an embodiment of the present invention in an open/deployed configuration.

FIG. 5A provides a front view of an embodiment of the present invention in a closed configuration 500. As depicted, the embodiment comprises a wall-mounting bracket 504 which houses a signage component 508. FIG. 5B provides a perspective view of the embodiment 520 showing the wall-mounting bracket 504 and the signage component 508. FIG. 5C provides a perspective view of an embodiment of the present invention in an open/deployed configuration 530. As depicted in FIG. 5C, in the open/deployed configuration the signage component 508 pivots out from the wall-mounting bracket 504 such that it may be better seen by evacuating people.

Figure 6:
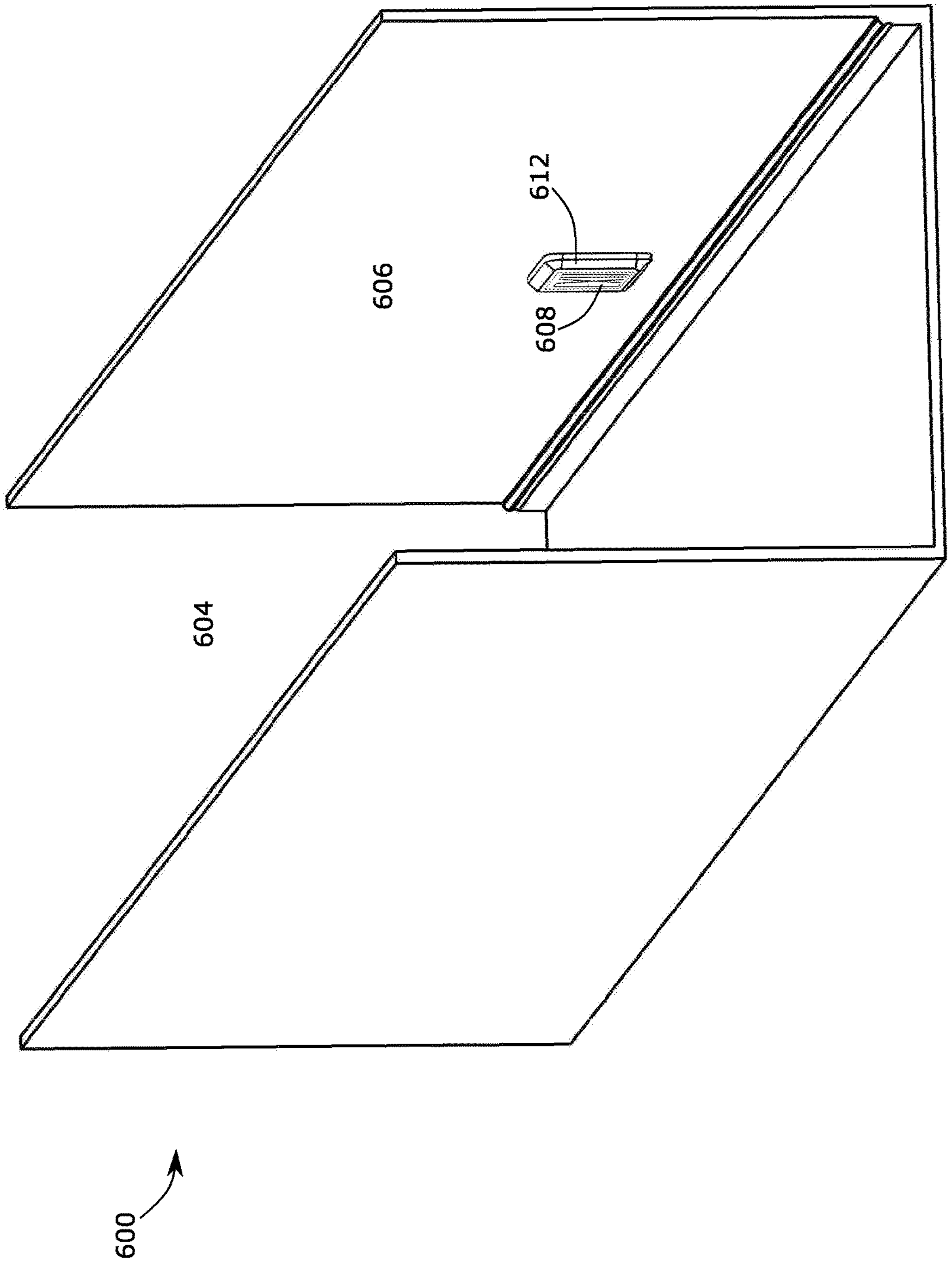
FIG. 6 provides an illustrative view of an embodiment of the present invention in a closed configuration as it may be installed in a hallway.

FIG. 6 provides an illustrative view of an embodiment of the present invention 600 as it may be installed in a hallway 604. As depicted, the wall-mounting bracket 612 is installed on a wall 606. The signage component 608 is in a closed configuration, as might be the case during a non-emergency condition. As such, the signage component 608 is flush with the wall-mounting bracket 612.

Figure 7:
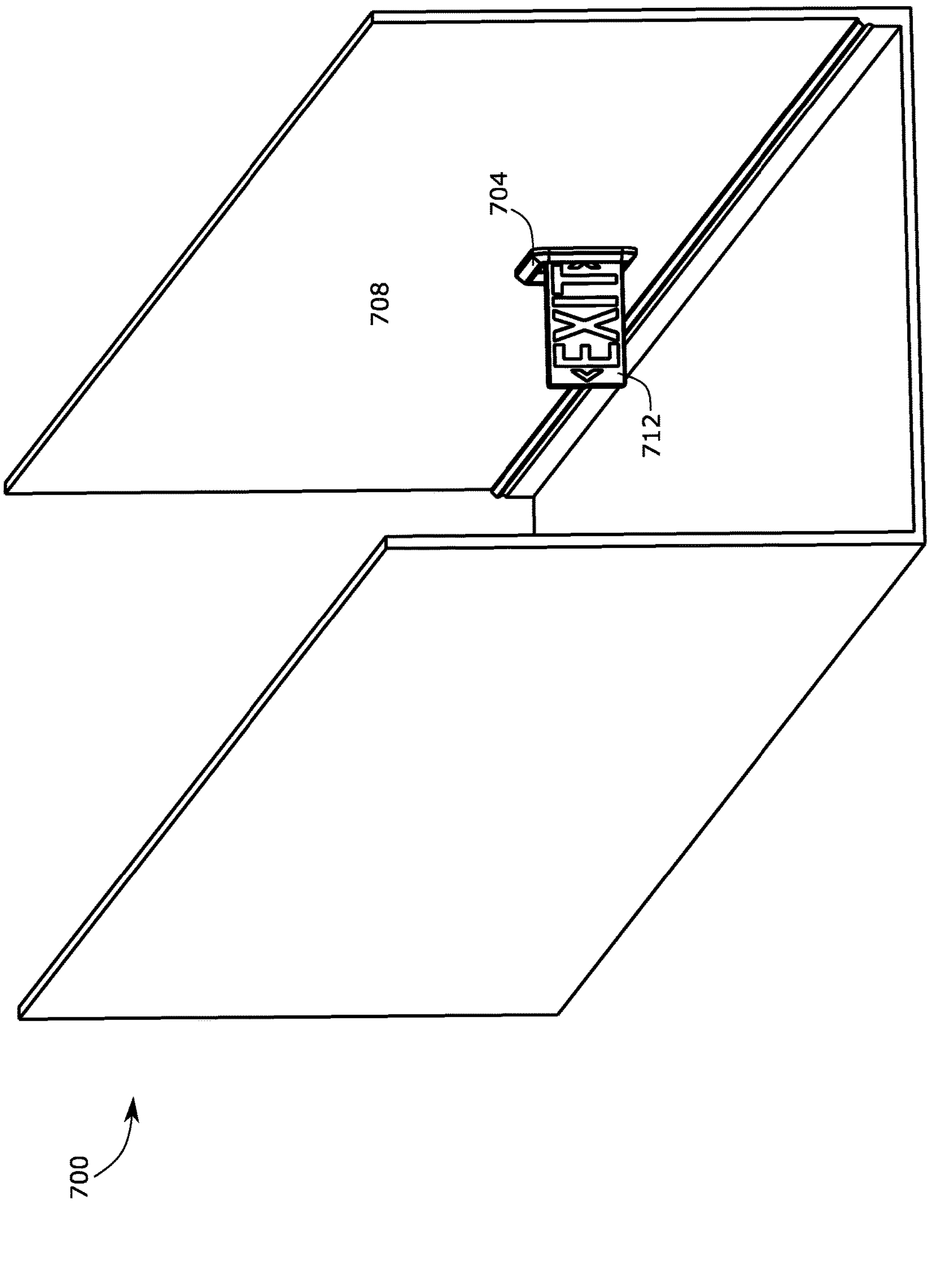
FIG. 7 provides an illustrative view of an embodiment of the present invention in an open/deployed configuration as it may be installed in a hallway.

FIG. 7 provides an illustrative view of an embodiment of the present invention in an open/deployed configuration 700. As depicted, the wall-mounting bracket 704 is installed on a wall 708. The signage component 712 is in an open/deployed configuration, as might be the case during an emergency condition. As such, the signage component 712 is pivoted out from the wall-mounting bracket 704 such that it may be better seen by evacuating people.

Figure 8:
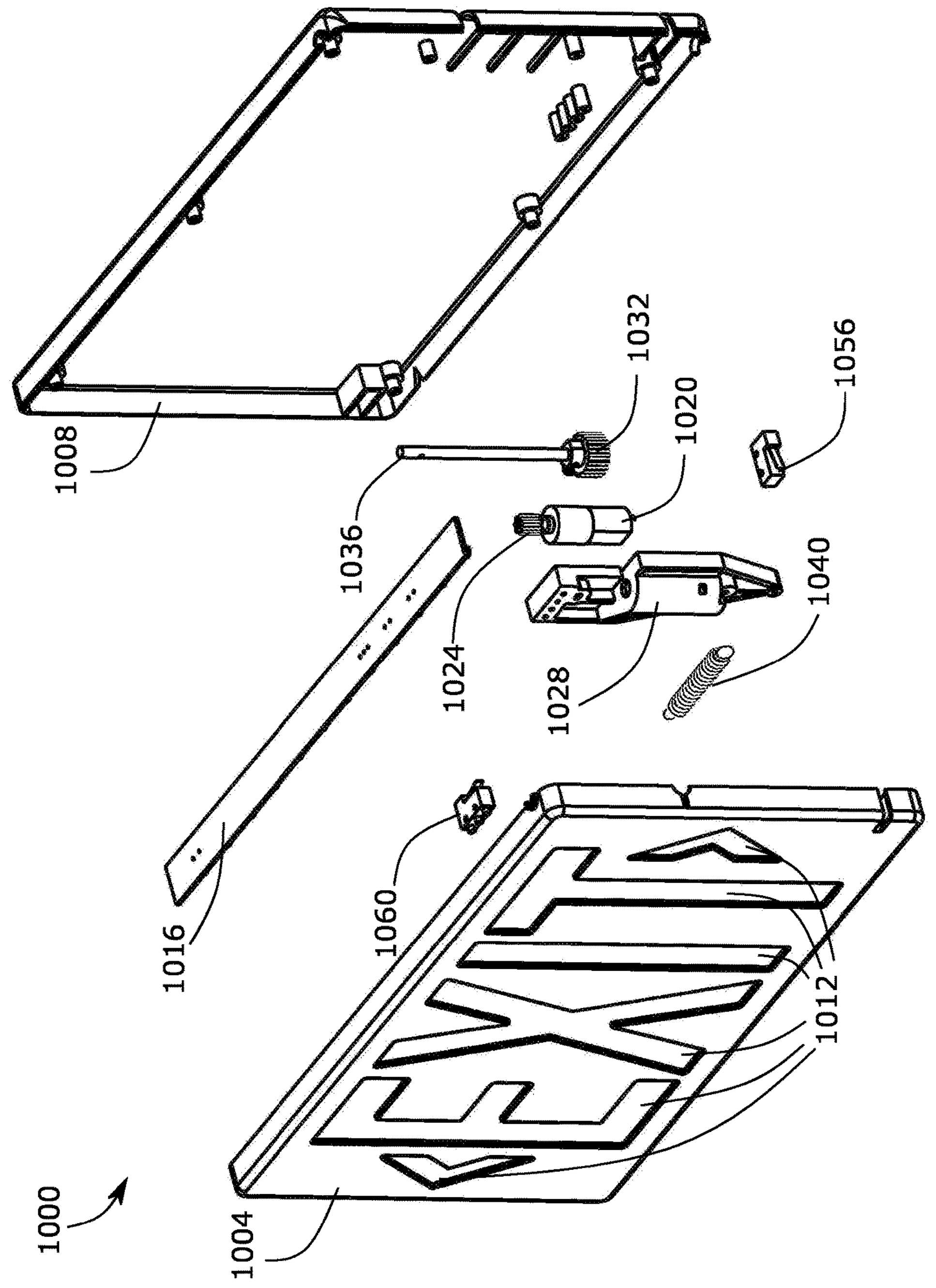
FIG. 8 provides an exploded view of an embodiment of the present invention.

FIG. 8 provides an exploded view of a signage component 1000 according to one embodiment of the present invention. The signage component 1000 is self-contained between the front housing 1004 and the rear housing 1008. The front housing 1004 comprises various signage elements 1012. As depicted, various elements are contained between the front housing 1004 and the rear housing 1008, including an LED light strip 1016.

In some embodiments, the signage elements 1012 comprise a transparent or translucent material, such as a transparent or translucent glass or plastic, such that light emitted by the LED light strip 1016 is visible through the signage elements 1012. In some embodiments, the signage elements 1012 may have a color associated with emergency signage, for example red, such that the light emitted by the LED light strip 1016 appears to have the color associated with emergency signage. In some embodiments, the signage elements may have no color (e.g., clear or white), and the LED light strip 1016 emits a light having a color associated with an emergency condition.

As depicted in FIG. 8, the signage component 1000 further comprises a motor 1020 with an attached drive gear 1024. The motor 1020 is housed in a motor bracket 1028. The drive gear is positioned as to engage a pivot gear 1032 attached to a pivot axle 1036. The signage component 1000 further comprises an extension spring 1040 which attaches to the motor bracket 1028. The extension spring 1040 provides a compressive force sufficient to keep the drive gear 1024 engaged with the pivot gear 1032.

Figure 9:
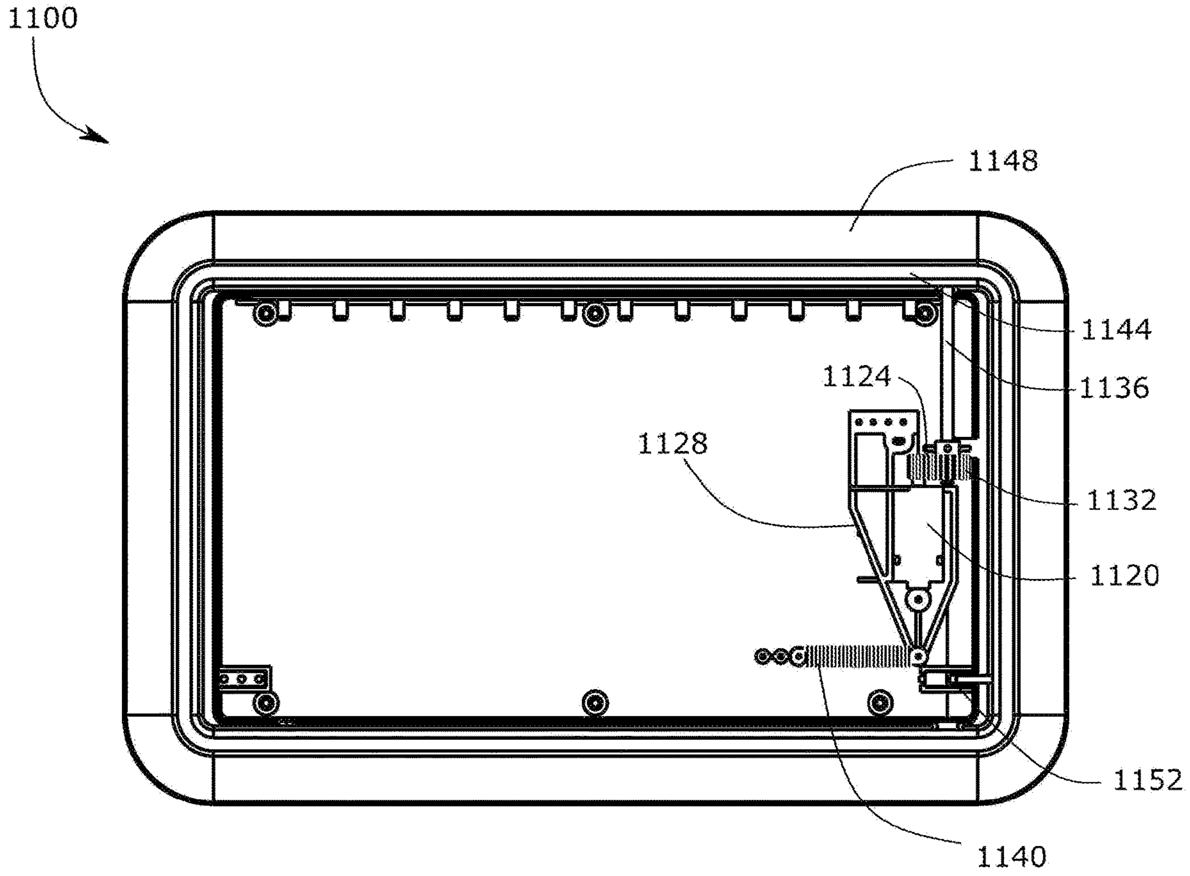
FIG. 9 provides a cutaway view of an embodiment of the present invention.

FIG. 9 provides a cutaway view 1100 of an embodiment of the present invention. As depicted, the motor 1120 is housed within the motor bracket 1128. The motor is attached to the drive gear 1124, which, in turn, engages the pivot gear 1132. The pivot gear 1132 is attached to the end of the pivot axle 1136. The pivot axle 1136 extends outside of the signage housing 1144 and attaches to the wall-mounting bracket 1148. The signage housing 1144 is pivotally coupled to the wall-mounting bracket 1148 at a hinge 1152.

In operation, activation of the motor 1120 causes the motor 1120 to rotate relative to the pivot axle, which, in turn causes the signage housing to rotate relative to the wall-mounting bracket 1148. The extension spring 1140 provides sufficient compressive force such that the drive gear 1124 and the pivot gear 1132 remain engaged during normal operation. If an external force is applied to the signage housing 1144, such as an evacuating person bumping the signage housing 1144 while exiting the building, the compression force provided by the extension spring 1140 can be overcome. This allows the drive gear 1132 to slip relative to the pivot gear 1136, thereby allowing the sign to be push out of the way of the passing evacuees.

With continued reference to FIG. 8, the signage component 1000 further comprises an open limit switch 1056 and a close limit switch 1060. In operation, the open limit switch 1056 is triggered by contact with the wall-mounting bracket (not pictured) when the signage component 1000 is in the fully open/deployed position. Triggering the open limit switch 1056 causes the motor to cease operation when opening. Similarly, the close limit switch 1060 is triggered by contact with the wall-mounting bracket (not pictured) when the signage component 1000 is in the fully closed state. This results in the motor to cease operation when closing.

Embodiments of the present invention have been described, as required by statute, to be illustrative, but should not be interpreted to be restrictive. One having skill in the art will recognize that many different arrangements of the various components depicted are possible without departing from the scope of the claims below, as well as arrangements including components not explicitly shown.

One having skill in the art will understand that certain combinations and/or sub-combinations of elements and features are of utility and may be employed without reference to other combinations and/or sub-combinations and are contemplated within the scope of the claims. Not all steps listed in the various figures need be carried out in the specific order described.

What is claimed is:

1. A fire exit sign comprising:

an exit sign pivotally coupled to a wall-mounting bracket, wherein the wall-mounting bracket is flush mounted to a lower portion of a wall;

an activation system coupled to the wall-mounting bracket, the activation system comprising a motor assembly, wherein the motor assembly comprises a drive gear that engages a pivot gear attached to a pivot axle that extends outside of the exit sign and attaches to the wall-mounting bracket, wherein the activation system is enabled to cause the exit sign to pivot out from the wall-mounting bracket via the motor assembly and cause the exit sign to move outward from the wall to a more visible position during an emergency; and a triggering mode, wherein the triggering mode is enabled to trigger the activation system to cause the exit sign to move outward from the wall.

2. The fire exit sign of independent claim 1, wherein the triggering mode is provided by a signal from a smoke detection system indicating smoke has been detected.

3. The fire exit sign of independent claim 1, wherein the triggering mode is provided by a signal from a fire detection system indicating that a fire has been detected.

4. The fire exit sign of independent claim 1, wherein the triggering mode uses a decibel meter that triggers the activation system when an audible fire alarm is detected.

5. The fire exit sign of independent claim 1, wherein the exit sign moves away from the wall by rotating away from the wall.

6. The fire exit sign of independent claim 1, wherein the exit sign is flexible.

7. The fire exit sign of independent claim 1, wherein the exit sign retracts when the emergency is over.

8. The fire exit sign of independent claim 1, wherein the exit sign is supported by at least one spring.

9. The fire exit sign of claim 8, wherein the at least one spring allows the exit sign to move out of a path of at least one of an evacuating person and a first responder.

10. The fire exit sign of independent claim 1, wherein the exit sign is illuminated by an electric light.

11. The fire exit sign claim 1, wherein the exit sign is illuminated by at least one of a luminescent tape, a luminescent ink, and at least one LED light.

12. The fire exit sign of independent claim 1, further comprising:

an independent power source.

13. The fire exit sign of claim 12, wherein:

the independent power source is a battery.

14. The fire exit sign of independent claim 1, wherein the activation system is enabled to cause the exit sign to rotate relative to the wall-mounting bracket around a vertical axis of the wall-mounting bracket to cause the exit sign to be at a substantially 90 degree angle relative to the wall-mounting bracket.

15. A fire exit system comprising:

a bracket, wherein the bracket is flush mounted to a lower portion of a wall, wherein an exit sign can be mounted to the bracket;

an activation system coupled to the wall-mounting bracket, the activation system comprising a motor assembly, wherein the activation system is enabled to cause the bracket to move outward from the wall via the motor assembly to a more visible position during an emergency; and a triggering mode, wherein the triggering mode is enabled to trigger the activation system to cause the bracket to move outward from the wall.

16. The fire exit system of independent claim 15, wherein the triggering mode is provided by a signal from a smoke detection system indicating smoke has been detected.

17. The fire exit system of independent claim 15, wherein the triggering mode is provided by a signal from a fire detection system indicating that a fire has been detected.

18. The fire exit system of independent claim 15, wherein the triggering mode uses a decibel meter that triggers the activation system when an audible fire alarm is detected.

19. The fire exit system of independent claim 15, wherein the exit sign retracts when the emergency is over.

20. The fire exit sign of independent claim 15, wherein the bracket is flexible.

* * * * *